United States Patent [19]

Sonoyama et al.

[11] E Re. 30,872

[45] Reissued Feb. 23, 1982

[54] PROCESS FOR PRODUCING 2-KETO-L-GULONIC ACID

[75] Inventors: Takayasu Sonoyama, Sakai; Bunji Kageyama, Ibaraki; Tahiko Honjo, Minoo, all of Japan

[73] Assignee: Shionogi & Co., Ltd., Osaka, Japan

[21] Appl. No.: 114,252

[22] Filed: Jan. 22, 1980

Related U.S. Patent Documents

Reissue of:

[64] Patent No.: 3,922,194
Issued: Nov. 25, 1975
Appl. No.: 452,656
Filed: Mar. 19, 1974

[30] Foreign Application Priority Data

Mar. 22, 1973 [JP] Japan ..... 48-32842

[51] Int. Cl.[3] ..... C12P 7/60
[52] U.S. Cl. ..... 435/138
[58] Field of Search ..... 435/138

[56] References Cited

U.S. PATENT DOCUMENTS 2,741,577 4/1956 Shoemaker ..... 435/138
3,076,750 2/1963 Muys et al. ..... 435/136

*Primary Examiner*—Alvin E. Tanenholtz
*Attorney, Agent, or Firm*—Birch, Stewart, Kolasch and Birch

[57] ABSTRACT

2-Keto-L-gulonic acid is prepared from 2,5-diketo-D-gluconic acid through microbial conversion. The 2-keto-L-gulonic acid producing microorganism used for this microbial conversion includes strains which belong to genera of Brevibacterium, Arthrobacter, Micrococcus, Staphylococcus, Pseudomonas and Bacillus. Both the incubation of the microorganism in a medium containing 2,5-diketo-L-gluconic acid and the direct contact of any products obtained from the cells with a substrate containing said 2,5-diketo-D-gluconic acid may be used in the disclosed process.

14 Claims, No Drawings

PROCESS FOR PRODUCING 2-KETO-L-GULONIC ACID

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention generally relates to an improvement in the production of 2-keto-L-gulonic acid. More particularly, it concerns a method of preparation of said acid from 2,5-diketo-D-gluconic acid through microbial conversion.

2. Description of the Prior Art

The 2-keto-L-gulonic acid which is useful as an intermediate for synthesising ascorbic acid has hithertofore been commercially produced by the so-called "Reichstein's method", which is known as a technically established process.

This method, however, comprises a number of complex steps and therefore any improvement in the overall yield is very difficult if not completely impossible. There have hitherto been a number of proposals which contemplate a reduction in the number of steps and/or an improvement in the overall yield.

For instance, a biochemical method wherein the 5-keto-D-gluconic acid is reduced to obtain selectively L-idonic acid which is subsequently oxidized to 2-keto-L-gulonic acid, a method of direct microbial conversion of L-sorbose into 2-keto-L-gulonic acid and the like are already known in the art.

These proposed methods have succeeded in the reduction in the number of the steps required for the production of 2-keto-L-gulonic acid at least theoretically but have unexceptionally failed in the actual improvement in the overall yield and in the feasibility or the steady operation of the total system.

Moreover, the attendant disadvantageous abundance of the resultant by-product both in terms of the kind and the quantity and difficulty in the separation of the intended product from the mixture which contains the by-products, and complexity in the operation hinder the commercialization of these processes.

THE SUMMARY OF THE INVENTION

It is therefore an object of the present invention to provide a novel method of producing 2-keto-L-gulonic acid which has achieved a reduction in the steps required for obtaining the intended product in the prior art processes. The improvement in terms of the reduction is very significant because it leads to a beginning of a completely novel pathway directed to the production of the 2-keto-L-gulonic acid.

According to the present invention, there is provided a method for producing 2-keto-L-gulonic acid which comprises; contacting a 2-keto-L-gulonic acid producing strain selected from the genera of Brevibacterium, Arthobacter, Micrococcus, Staphylococcus, Pseudomonas or Bacillus or any product obtained by treating cells of said strain with 2,5-diketo-D-gluconic acid or any salts thereof.

The starting material of the method of this invention is 2,5-diketo-D-gluconic acid, any salts thereof or any fermentation products which include such acid or salts, and which acid or its salts may be obtainable in a good yield by, for instance, oxidizing D-glucose by a microbial process with a strain of microorganism. In the following description, any substance including such acid or salts will be simply referred to as substrates.

The 2-keto-L-gulonic acid producing strains of microorganisms employed in the method of this invention can be exemplified as those separated from soil and sewage by the present inventors, which includes Brevibacterium ketosoreductum nov. sp. ASM-1005 (deposited with the Fermentation Research Institute (a division of the agency of industrial science and technology, Japan) as FERM-P 1905, and with the American Type Culture Collection as ATCC-21914), Arthrobacter simplex ASM-10 (FERM-P 1902, ATCC 21917). Bacillus megaterium ASM-20 (FERM-P 1903, ATCC 21916) and Staphylococcus aureus ASM-30 (FERM-P 1904, ATCC 21915).

In addition to the above, the available microorganisms include strains which are preserved in any public depository (culture collection) for delivery to any one upon request such as the Institute of Fermentation, Osaka (IFO). Micrococcus [dinitrificans] *denitrificans* IFO 12442, Micrococcus rubens IFO 3768, Micrococcus roseus IFO 3764 and Pseudomonoas chloroaphis IFO 3904, employed by the inventors fall into this category.

Of these microorganisms, those isolated from soil and sewage by the present inventors will be described taxonomically in detail in the following paragraphs.

I. ASM-1005 strain

A. Observations:

1. Shape of cells (bouillon agar slants and bouillon broth at 30° C. for 3 days):
   Rods, 0.4–0.7×0.8–1.4μ, occurring singly and in pairs with rounded ends. Snapping division is found but no branching is observed.
2. Motility: Motile with monotrichous flagellum.
3. Spore: Not formed.
4. Gram staining (bouillon agar slants, at 30° C. for 7 days): Positive.
5. Acid-fast: Negative.

B. Growth on various media:

1. Bouillon agar colonies (30° C. 24–48 hrs.): Circular, smooth, entire, convex, glistening, translucent, orange-yellow.
2. Bouillon agar slant (30° C. 24–72 hrs.): Growth moderate, filiform and butyrous; orange-yellow to orange
3. Bouillon broth (30° C. 7 days): Moderately turbid; membranous surface growth; viscid sediment; no odor.
4. Bouillon gelatin stab: Liquefaction; at 20° C., liquefaction is observed slightly 2 days later and then becomes saccate-form 7 days later, approximately 4 mm in diameter and 7 mm in depth; at 25° and 30° C., a more distinct liquefaction is observed.
5. Litmus milk (30° C., 14 days): Acid; slightly coagulated.
6. Potato slant (30° C., 14 days): Growth poor; pale orange-yellow glistening.
7. Bouillon D-gluconate agar slant (30° C., 72 hrs.) Growth abundant; filiform; vivid bright orange-yellow glistening.

C. Physiological properties (unless otherwise indicated, based on the results of the observation at 30° C. within 14 days):

1. Nitrite: Not produced from nitrate.

2. Denitrification: Neither growth nor gas production observed in paraffin-sealed bouillon broth containing 1% $KNO_3$.
3. Methyl-red test: Positive.
4. Voges-Proskauer reaction: Negative.
5. Indole: Not produced.
6. Hydrogen sulfide: Produced.
7. Ammonia: Produced slightly.
8. Starch: Not hydrolyzed.
9. Growth on citrate media:
   i. Koser's medium: Scant growth.
   ii. Christensen's medium: Growth.
10. Growth with inorganic nitrogen sources:
   i. Ammonium (Glucose-Hucker's medium): No growth.
   ii. Nitrate (Glucose-Dimmick's medium): the medium slightly colored yellowish.
11. Pigment formation: Not formed.
12. Urease: Positive.
13. Catalase: Positive.
14. Oxidase (bouillon agar slant, 18–24 hrs., tetramethylphenylenediamine): Slightly positive.
15. Temperature relations:
   i. Temperature of growth: 10°–40° C.; No growth at 4° C. and 45° C.
   ii. Optimum temperature of growth: 28°–35° C.
16. pH relations:
   i. pH of growth: 5.0–10.0.
   ii. Optimum pH of growth: 6.0–8.0.
17. Oxygen requirement: Facultative;
   i. Paraffin-sealed stab culture turns yellow uniformly (7 days at 30° C., Glucose-BCP medium).
   ii. Growth is observed by the Shotensack method after incubation for 16 days.
18. O–F test (Hugh-Leifson's method): Acid is anaerobically produced from D-glucose, but neither acid nor gas is produced from lactose.
19. Production of acids and gases from sugars (Barsiekow's medium):
   i. Acid but no gas from D-xylose, D-glucose, D-mannose, D-fructose, D-galactose, maltose, sucrose, trehalose, D-mannitol and glycerin (weak).
   ii. Neither acid nor gas from L-arabinose, lactose, D-sorbitol, inositol and starch.
20. Cellulose (Peptone-water+microcrystalline cellulose): Not hydrolyzed.
21. Methylene-blue (bouillon broth, 18–24 hrs.): Reduced.
22. D-gluconic acid: Utilized.
23. 2-Keto-D-gluconic acid: Slightly utilized.

D. Origin: Soil.

The above taxonomical properties are compared with the description of Bergey's Manual of Determinative Bacteriology (7th Edition, hereinafter to be simply referred to as the "Manual") to lead to the conclusion that this strain belongs to the genus of Brevibacterium in view of the observations; being facultative and gram-positive short rods which form no spore, and showing snapping division but no branching.

This strain shows a kind of coincidence with the classification key of Brevibacterium acetylicum in the above manual and is considered to be in a close relation thereof by the features found in the further observations; being motile, liquifying gelatin, assuming orange-yellow to orange on bouillon agar slant and its poor growth with pale orange-yellow color on potato agar slant.

However this strain still has other taxonomical properties which are widely different from those of Brevibacterium acetylicum described in the above manual in that: different characteristics of the colonies and of the bouillon broth cultures; acidified litmus milk and weak coagulation thereof; no peptonization; no hydrolyzation of starch; a relatively high optimum temperature of growth at 28°–35° C. and negative Voges-Proskauer's reaction.

Furthermore, since this strain does not show a coincidence with any other known species of the genus, it (ASM-1005 strain) is considered to belong to a new species, and has been named as Brevibacterium ketosoreductum nov. sp. by the present inventors.

II. ASM-10 strain:

A. Observations:
1. Shape of cells: In bouillon broth at 30° C., cells appear as short rods with rounded ends of $0.8–1.0\times1.5–2.0\mu$ during their inductive period i.e., initiation of the incubation. Many of the cells become longer rods of $0.8–1.0\times6.0–8.0\mu$ during their logarithmic growth period and then become cocci at their stationary phase of culture with the further progress of the culture. Smaller cells are abundant in bouillon agar slants at 30° C. as compared with the bouillon broth. Although they appear as rods of $0.5–0.8\times1.4–1.8\mu$ during the initial stage of the culture, they become longer and finally, the [coccid] *coccoid* form prevails in an old culture (48–72 hrs.) In both cultures, cells vary in size and shape: i.e., bending, swelling and [coccid] *coccoid* forms are observed.
2. Motility: Motile with peritricuous flagella.
3. Spore: Not formed.
4. Gram staining: Negative in the young culture. Later, [coccid] *coccoid* forms which can be positively stained become prevalent.
5. Acid fast: Negative.

B. Growth on various media:
1. Bouillon agar colonies (30° C., 24–72 hrs.): In the young culture, circular, smooth, entire, raised, cream-colored, glistening and opaque, but the edge becomes undulate with the progress of the culture.
2. Bouillon agar slant (30° C., 24–72 hrs.): Growth moderate, filiform, cream-colored, butyrous and glistening.
3. Bouillon broth (30° C., 7 days): Moderately turbid; no surface growth; flocculent or flaky sediment with no odor.

[4. Bouillon gelatin stab (20° C., 21 days):]

4. Bouillon gelatin stab (20° C., 21 days): Liquefaction is observed 2 or 3 days later and then becomes saccate-form of 1 to 1.5 cm in depth, 5 days later; good surface growth and beaded growth along the stab.
5. Soil extract agar slant (30° C., 24 hrs.): Growth poor, filiform, smooth, flat, pale-yellow and glistening.
6. Arginine agar slant (30° C., 48 hrs.): No growth.
7. Litmus milk (30° C., 14 days): Acid 3 days later; distinct coagulation is observed on 7th day and afterwards.
8. Potato agar slant (30° C., 14 days): Growth moderate, glistening, white to cream-colored.

C. Physiological properties (unless otherwise indicated, based on the results of the observation at 30° C. within 14 days):
1. Nitrite: [Not Producedd] *Produced* from nitrate.

2. Denitrification: Growth but no gas production in paraffin sealed bouillon broth containing 1% $KNO_3$.
3. Methyl-red test: Positive.
4. Voges-Proskauer reaction: Negative.
5. Indole: Not produced.
6. Hydrogen sulfide: Produced.
7. Ammonia: Produced slightly.
8. Starch: Not hydrolyzed.
9. Growth on citrate media
   i. Koser's medium: Growth.
   ii. Christensen's medium: Growth.
10. Growth with inorganic nitrogen sources:
   i. Ammonium (Glucose-Hucker's medium): Growth.
   ii. Nitrate (Glucose-Dimmick's medium): Growth.
11. Pigment formation: Not formed.
12. Urease: Negative.
13. Catalase: Positive.
14. Oxidase (bouillon agar slant, 18–24 hrs., tetramethylphenylenediamine): Slightly positive.
15. Temperature relations:
   i. Temperature of growth: 10°–37° C.; No growth at 4° C. and 40° C.
   ii. Optimum temperature of growth: 25°–31° C.
16. pH relations:
   i. pH of growth: 5.0–9.0.
   ii. Optimum pH of growth: 6.0–8.0.
17. Oxygen requirement: [Faculative] *Facultative* (Paraffin-sealed stab culture turns yellow uniformly).
18. O–F test: Acid is anaerobically produced from D-glucose and lactose.
19. Production of acids and gases from sugars (Barsiekow's medium):
   i. Acid but no gas from D-xylose, D-glucose, D-mannose, D-fructose, D-galactose, sucrose, lactose and D-mannitol.
   ii. Neither acid nor gas from L-arabinose, maltose, trehalose, D-sorbitol, starch and inulin.
20. Cellulose (Peptone-water+microcrystalline cellulose): Not hydrolyzed.
21. Methylene blue (bouillon broth, 18–24 hrs.): Not reduced.
22. D-gluconic acid: Utilized.
23. 2-Keto-D-gluconic acid: Utilized.

D. Origin: Soil.

The above taxonomical properties are compared with the description of the "Manual" to lead to the conclusion that this strain belongs to the genus of Arthrobacter in view of the observations; being short rods in young culture, which later become longer with the progress of the incubation and finally become cocci in old culture, in spite of their gram-negative nature in young culture which turns out gram-positive when [coccid] *coccoid* form prevails in old culture.

This strain also shows a striking coincidence with the classification key of Arthrobacter simplex in the above manual with the observations; being able to utilize nitrogen sources of nitrates and ammonium; being able to utilize citrates as organic nutrients; and being able to be grown sufficiently at 37° C.

Therefore this strain is identified as belonging to the species of the known Arthrobacter simplex though it still holds slight differences in; no growth in arginine agar slant, the cream-colored potato agar slant, coagulation of litmus milk and production of acid, and the temperature of growth.

III. ASM-20 strain:

A. Observations:
1. Shape of cells (bouillon agar slants, 30° C., 8–48 hrs.): Rods of $1.0–1.2\times2.5–4.0\mu$ with rounded or square ends, occurring singly or in pairs and sometimes in chains. Frequently, filamentous and curved forms are observed.
2. Motility (bouillon agar slant, 20° C. and 30° C., 8–24 hrs.): Not observed.
3. Spore (bouillon agar slant, 30° C.): Ellipsoids of $0.8–1.0\times1.4–1.6\mu$. Swelling of sporangium is not observed. Subterminal to terminal, and many formed in 48 hrs.
4. Gram-staining (bouillon agar slant, 30° C., 8–48 hrs.): Positive.
5. Acid fast (bouillon agar slant, 30° C.): Negative.
6. Capsule staining: Positive.

B. Growth on various media:
1. Bouillon agar colonies (30° C., 24–72 hrs.): Circles of 1–4 mm in diameter, rough, undulate, raised, concentrically ringed, weakly glistening cream-colored and opaque.
2. Bouillon agar slant (30° C., 24–48 hrs.): Growth abundant, filiform; cream-colored, viscid but non-adherent, weakly glistening and slightly wrinkled.
3. Bouillon broth (30° C., 8 days): Turbidity flocculent 1 or 3 days later; broth relatively clear with moderate amounts of flocculent sediment; no surface growth and no odor.
4. Glucose bouillon slant (30° C., 24 hrs.): Growth more abundant and more viscid with gum than on bouillon agar slants; wrinkled; dull and cream-colored.
5. Bouillon gelatin stab (30° C., 12 days): Stratiform liquefaction is observed 5 days later, but the growth and liquefaction along the line of puncture are not observed.
6. Litmus milk (30° C., 13 days): Slightly acidic; peptonization is observed.
7. Milk agar streak plate (30° C., 48 hrs.): Wide transparent zone of hydrolysis around the colony.
8. Potato agar slant (30° C., 13 days): Growth abundant, spreading, cream-colored to light gray, glistening, coarsely wrinkled; viscid with gum; medium being made grayish brown-colored 6 days later.
9. Tyrosine agar slant (30° C., 7 days): Growth moderate; no pigment produced.

C. Physiological properties (unless otherwise indicated, based on the results of the observation at 30° C. within 14 days):
1. Nitrite: Not produced from nitrate.
2. Denitrification: Neither growth nor gas production is observed in paraffin-sealed bouillon broth containing 1% $KNO_3$.
3. Methyl-red test: Positive.
4. Voges-Proskauer's reaction: Negative.
5. Indole: Not produced.
6. Hydrogen sulfide: Slightly produced.
7. Ammonia: Not produced.
8. Starch: Hydrolyzed.
9. Growth on citrate media:
   i. Koser's medium: Growth.
   ii. Christensen's medium: Growth.
10. Growth with inorganic nitrogen sources:

i. Ammonium (Glucose-Hucker's medium): Growth.
ii. Nitrate (Glucose-Dimmick's medium): Growth.
11. Pigment formation: Not formed.
12. Urease: Positive.
13. Catalase: Positive.
14. Oxidase: Negative.
15. Temperature relations:
i. Temperature of growth: 20°–45° C.; No growth at 10° C.
ii. Optimum temperature of growth: 30°–35° C.
16. pH relations:
i. pH of growth: 6.0–9.0.
ii. Optimum pH of growth: 7.0.
17. Oxygen requirement: Aerobic (Growth only on the surface of stab culture).
18. O–F test: Acid is aerobically produced from D-glucose. About ¼ upper layer of stab culture is yellowed
19. Acids: Produced from mannitol (Hucker's medium with ammonium salt) 24 hrs. later.
20. Production of acids and gases from sugars (Barsiekow's medium):
i. Acid but no gas from L-arabinose, D-xylose*, D-glucose*, maltose, sucrose*, D-mannitol*, trehalose and glycerin*. * After the acid is produced, the medium is turned [aklaline] *alkaline.*
ii. Neither acid nor gas is produced from D-mannose, D-fructose, D-galactose, lactose, D-sorbitol, inositol and starch.
21. Cellulose (Peptone-water+microcrystalline cellulose): Hydrolyzed.
22. Methylene blue (bouillon broth, 24 hrs.): Reduced weakly.
23. Salt tolerance: Growth after 6 days in a bouillon broth containing 9% NaCl.

D. Origin: Soil.

The above taxonomical properties are compared with the description of the "Manual" to lead to the conclusion that this strain belongs to the genus of Bacillus in view of the observations; being rods of catalase-positive, aerobic and gram-positive, and forming spores.

This strain is regarded as similar to the Bacillus megaterium in the above manual with further observations; no swelling of sporangium is observed, having a large diameter of the cells of more than 0.9$\mu$, a negative result of Voges Proskauer's reaction and producing acid from mannitol utilizing ammonium salt.

In addition to the above, the strain makes a striking coincidence with a variant of Bacillus megaterium in the above manual by comparing the taxonomical properties. Therefore this strain is identified as belonging to the species of the known Bacillus megaterium and is named as Bacillus megaterium ASM-20 by the present inventors.

IV. ASM-30 strain:

A. Observations:
1. Shape of cells (bouillon agar slants, 30° C.): Spheres of 0.9–1.2$\mu$ in diameter, occurring singly, or in pairs, and sometimes in short chains and in irregular clumps.
2. Motility (bouillon agar slants, 20°, 25° and 30° C.): Not observed.
3. Spore (bouillon agar slants, 30° C.): Not formed.
4. Gram-staining (bouillon agar slants, 30° C.); Positive.
5. Acid fast (bouillon agar slants 30° C.): Negative.

B. Growth on various media:

1. Bouillon agar colonies (30° C., 24–48 hrs.): Circular, smooth, entire, raised, opaque orange-yellow and glistening.
2. Bouillon agar slant (30° C., 24–48 hrs.): Growth moderate, filiform, glistening butyrous orange-yellow;
3. Bouillon broth (30° C., 7 days): Moderate clouding; no surface growth; viscid sediment with no odor.
4. Bouillon gelatin stab (20° C. and 25° C., 12 days): Stratiform liquefaction with yellow pellicle and yellow sediment, on 3rd day and afterwards.
5. Litmus milk (30° C., 14 days): Slightly acidified, not coagulated.
6. Potato agar slant (30° C., 14 days): Growth moderate (for two days), filiform; white to cream-colored and glistening.

C. Physiological properties (Unless otherwise indicated, based on the results of the observation at 30° C. within 14 days):
1. Nitrite: Produced from nitrate.
2. Denitrification: Growth but no gas production in a paraffin-sealed bouillon broth containing 1% $KNO_3$.
3. Methyl-red test: Positive.
4. Voges-Proskauer's reaction: Negative.
5. Indole: Not produced.
6. Hydrogen sulfide: Not produced.
7. Ammonia: Produced.
8. Starch: Not hydrolyzed.
9. Growth on citrate media:
i. Koser's medium: No growth.
ii. Christensen's medium: No growth.
10. Growth with inorganic nitrogen sources:
i. Ammonium (Glucose-Hucker's medium): No growth.
ii. Nitrate (Glucose-Dimmick's medium): No growth.
11. Pigment formation: Not formed
12. Urease: Weakly positive.
13. Catalase: Positive.
14. Oxidase: Negative.
15. Temperature relations:
i. Temperature of growth: 10°–40° C.; No growth at 4° C. and 45° C.
ii. Optimum temperature of growth: 35°–40° C.
16. pH relations:
i. pH of growth: 5.0–9.0.
ii. Optimum pH of growth: 6.0–7.0.
17. Oxygen requirement: Facultative (Growth on the whole layer of a paraffin-sealed stab culture)
18. O–F test: Acid is anaerobically produced from D-glucose.
19. Production of acids and gases from sugars (Barsiekow's medium):
i. Acid but no gas from D-glucose, D-mannose, D-fructose, D-galactose, sucrose, lactose, trehalose, D-mannitol and glycerin. Acid production from D-mannitol is poor.
ii. Neither acid nor gas from L-arabinose, D-xylose, maltose, D-sorbitol, inositol and starch.
20. Cellulose (Peptone-water+microcrystalline cellulose): Not hydrolyzed.
21. Methylene blue (bouillon broth, 24 hrs.): Slightly reduced.
22. D-gluconate: Utilized.
23. 2-Keto-D-gluconate: Weakly utilized.
24. Coagulase (Difco's bacto-coagulase plasma): Positive.

25. Blood agar: Beta hemolysis produced.
26. Salt tolerance (Bouillon broth containing NaCl): Good growth at 11%, growth at 13%, no growth at 15%.
27. Lactic acid: Produced from D-glucose.

D. Origin: Sewage.

The above taxonomical properties are compared with the description of the "Manual" to lead to the conclusion that this strain belongs to the genus of Staphylococcus in view of the observations: being cocci which form irregular clumps, gram-positive, no spore, facultative and salt tolerate, and producing acid anerobically from D-glucose.

Furthermore, the physiological properties of this strain coincide with those of Staphylococcus aureus of the above manual in that it produces acid from D-mannitol, even though being very weak, and being coagulase-positive.

Therefore, despite the observed trivial disagreements in the growth on bouillon broth, bouillon gelatin stab and litmus milk, and in production of acetoin, which are not regarded as being so significant, the strain is identified to belong the known species of Staphylococcus aureus and is named as Staphylococcus aureus ASM-30 by the present inventors.

Any mutated or modified strains obtained by artificially or inductively mutating the aforedefined strains of the microorganism, with a treatment by means of, for instance, ultraviolet or X-ray irradiation, or a mutating agent such as nitrogen mustard, may likewise be utilized in this method with advantages.

In the method of this invention, the aforedescribed strains may be inoculated with and incubated in a medium which includes the aforedefined substrate and the cells of such strain, for instance, resting cells or any processed product obtained from the cells may be placed to act directly on the substrate. Any means per se known for incubating microorganism may be adopted although the use of aerated and agitated deep-tank fermenters are particularly preferred. A preferred result may be obtainable from an incubation which utilizes a liquid broth medium.

As regards the nutrient medium available for the incubation of the microorganism, although no special restriction is imposed on its class, a medium suitably including carbon sources, nitrogen sources, other inorganic salts, a small amount of other nutrients and the like, which can be utilized by the microorganism is desirable for the advantageous incubation of the microorganism. Various nutrient materials which can generally be used for the better growth of the microorganism may suitably be included in the medium.

The nitrogen source includes inorganic or organic nitrogen compounds, or compositions containing such compounds which may be exemplified as ammonium salts, nitrate salts, corn steep [,] liquor, peptone, meat extract, bean powder, wheat gluten, yeast extract, yeasts and urea.

The carbon sources which may be included in the medium as the substrate can be exemplified as polyhydric alcohols or sugars such as glucose, glycerol, sucrose, lactose, dextrine, maltose and molasses in addition to the starting material, 2,5-diketo-D-gluconic acid.

Salts of, for instance, calcium, magnesium, potassium, zinc, copper, iron and other metals are employed as the inorganic salts.

For the advantageous performance of the incubation, any suitable factor which can promote the formation of the end product may be added to the medium.

The mixing ratio of these nutrients and the amounts assigned to each ingredient may vary with the generic property of the used strain and the amounts of the starting material, 2,5-diketo-D-gluconic acid, and the other attendant conditions of the incubation may be selected or determined in accordance with the particulars of the individual case.

Although the concentration of 2,5-diketo-D-gluconic acid in the medium may also be varied with the generic character and the like of the employed strain, a concentration of about 1–200 g/l is generally applicable and, inter alia, a concentration of about 1–50 g/l is preferred.

The conditions of the incubation may also vary with the species and generic character of the used strain, the composition of the medium and other attendant factors, and may, of course, be selected or determined in accordance with the particulars of the individual cases in order to yield the intended product most efficiently although an incubation temperature of about 20°–35° C. and a pH value of the medium of about 4–9 may preferably be maintained. Normally, an incubation period ranging from 10 hours to 100 hours may be sufficient and the formation of the intended product in the medium reaches its maximum value within such period.

In order to maintain the pH value of the medium to that most suitable for the enzymatic activity of the substance which is produced by the microorganism, any suitable acidic or basic agent may be added to the medium in a suitable amount at a suitable time during the incubation. The same object may alternatively be accomplished by initially incorporating a suitable buffer into the medium at the beginning of the incubation.

The required total amount of the starting material, 2,5-diketo-D-gluconic acid, may be incorporated in the medium all at once at the beginning of the incubation or may be added to the medium in portions at any time during the incubation.

In addition to the previously-described incubation of the microorganism strain, the process of the present invention affords another means wherein the cells of the microorganism, i.e., resting cells, acetone treated products of the ground cells, cells of lypholized strains, the ground products thereof and the like are contacted directly with the substrate containing the starting material, 2,5-diketo-D-gluconic acid.

In such cases of direct contact of the cells or the processed product thereof with the substrate, the conditions of temperature, pH value and the like which are the same as or similar to the case of the incubation of the strain itself may be employed. Furthermore, any buffer solution may suitably be used to maintain the pH value of the substrate constant.

The amount of the cells or the processed product thereof employed in this direct contact method, may desirably be sufficient for converting the total amount of the starting material, 2,5-diketo-D-gluconic acid in the substrate into the intended product, 2-keto-L-gulonic acid.

The 2-keto-L-gulonic acid thus formed and accumulated in the medium may be separated and purified by any per se known suitable means which utilizes the property of the product, and it may be separated as the free acid or as a salt of sodium, potassium, calcium, ammonium or the like.

In the case wherein the 2-keto-L-gulonic acid is obtained as its free state, it may be converted into any salts of, for instance, sodium, potassium, calcium, ammonium or the like by any suitable per se known means, while if the process yields a salt, the salt may be converted into its free acid or into any other salts by any suitable means.

Any methods may be employed for the separation of the intended product from the medium unless they deteriorate the object of the present invention. For instance, the separation may be performed in any suitable combination or repetition of the following unit processes; (a) removal of the cells of the microorganisms from the fermented broth by filtration, centrifugation or treatment with active charcoal, (b) precipitation of the intermediate crystals by concentrating the filtered broth, (c) recovery of the precipitated crystals by filtrating or centrifugating the concentrated broth, (d) recrystallization of the intermediate crystals, (e) extraction with solvent, and (f) fractionation by chromatography.

The identification of the 2-keto-L-gulonic acid obtained by the method of this invention may be performed by, for instance, elemental analysis as well as measurement of physicochemical properties such as melting point, the spectrum of infrared absorption, optical rotation and the like.

DESCRIPTION OF THE PREFERRED EMBODIMENT

In the following, the process of the present invention will be illustrated in more detail by way of example wherein; mixtures obtained by mixing an aqueous solution of salts of 2,5-diketo-D-gluconic acid having removed therefrom any microorganisms by filtration with a liquid containing the remainder of the required ingredients while both liquids are being cooled, is used as substrates because of the poor heat-stability of said salts.

In a commercial scale operation, an employment of more pertinent, effective and safe procedure of sterilization, for instance, continuous heat sterilization or filtration by a micro-filter is, however, recommended.

EXAMPLE 1

A sterilized medium (600 ml) containing 1.5% of calcium 2,5-diketo-D-gluconate, 0.3% of glycerol, 0.1% of polypeptone, 0.1% of yeast extract, 0.1% of monopotassium phosphate and 0.02% of magnesium sulfate (7 $H_2O$) and having a pH value of about 6.3–7 is introduced into a small fermenter of 1.5 l, and a suspension (20 ml, in sterilized water) of Brevibacterium ketosoreductum (Nov. Sp.) which is previously cultured on a bouillon agar at 30° C. for 2 days, is inoculated.

An aerated (1 v.v.m.) culture while being stirred (300 r.p.m.) is performed at 30° C. At each given time during the incubation, samples are withdrawn from the broth to confirm the formation of 2-keto-L-gulonic acid as a pink spot on a paper partition chromatogram which utilizes a mixed solution of phenol: water: formic acid (75:25:4) as a developing solvent.

A quantitative determination by means of gas-liquid chromatography (column, silicone gum: SE-52; sample, silylated) gives the following results.

| Incubation time (hrs.) | 36 | 48 | 72 |
|---|---|---|---|
| 2-keto-L-gulonic acid (γ/ml) | 200 | 620 | 1890 |

EXAMPLE 2

A sterilized medium (15 l) containing 1% of potassium D-gluconate, 0.2% of polypeptone, 0.2% of yeast extract, 0.1% of monopotassium phosphate and 0.02% of magnesium sulfate (7 $H_2O$), and having a pH value of 6.7–7 is prepared in a fermenter of 30 l.

This medium is inoculated with the aqueous suspension of Brevibacterium ketosoreductum of Example 1 to perform an aerated incubation at 30° C., 300 r.p.m. and 1 v.v.m.

A portion of the cells of microorganism is separated from the broth at its logarithmic growing period, washed twice with physiological saline water, and suspended in a sterilized phosphate buffer (0.1 mole, pH 6.86, 400 ml).

To this suspension of the cells, there is added an aqueous solution (200 ml) containing 3% of 2,5-diketo-D-gluconic acid and being removed of any microorganisms by filtration, and the combined liquid is stirred at 30° C. for 48 hrs.

At each given time during the contacting treatment, samples are withdrawn from the mixture to perform a qualitative detection by means of paper partition chromatography and a quantitative determination by means of gas-liquid chromatography which proves the formation of 2-keto-L-gulonic acid at the beginning of the contacting operation.

After the contacting operation of 48 hrs, the liquid is removed from the cells by means of centrifugation and concentrated at room temperature under reduced pressure.

The concentrated liquid is then treated with an ion exchange resin (Amberlite 1R-120) and active charcoal, and again concentrated after filtration. The solution is then passed through an ion exchange resin (Amberlite CG-400, formic acid type) to permit the formed 2-keto-L-gulonic acid to adsorb therein.

Required fractions of eluate obtained by a gradient elution of the adsorbed resin with 0.2 N–1 N formic acid are collected. After the formic acid is removed by extraction with ether, the collected fractions are concentrated to give a syrup.

An addition of a small amount of water to the syrup and letting it stand for a night gives crystals of 2-keto-L-gulonic acid.

Physico-chemical properties, i.e., melting point, optical rotation and spectrum of infrared adsorption, of the recrystallized product are found to be completely identical with those of an authentic sample of 2-keto-L-gulonic acid which is [sythetically] *synthetically* derived from L-sorbose.

EXAMPLE 3

Measured (each 80 ml) amounts of the sterilized medium containing 0.7% of calcium 2,5-diketo-D-gluconate, 0.1% polypeptone, 0.1% of yeast extract, 0.05% of glucose, 0.1% of monopotassium phosphate and 0.02% of magnesium sulfate (7 $H_2O$), and having a pH value of 6.3–7, are placed in shaking flasks of 500 ml.

One loopful of Bacillus megaterium, isolated from soil and previously incubated on a bouillon agar, is inoculated in each of the shaking flasks.

The fermentation is carried out in a rotary shaker of 200 r.p.m. at 30° C. for 96 hrs. Qualitative determination of the sample broths, performed as described in Example 1, gives the following results.

| Incubation time (hrs.) | 24 | 48 | 72 | 96 |
|---|---|---|---|---|
| 2-keto-L-gulonic acid (γ/ml) | 40 | 55 | 68 | 44 |

EXAMPLE 4

Measured amounts (each 15 ml) of the sterilized medium used in the experiment of Example 2 are placed in test tubes of 70 ml wherein into each one [looful] *loopful* of strains isolated from soil or sewage, and type culture strains obtained from the IFO (Institute of Fermentation, Osaka), previously incubated on a bouillon agar, are inoculated.

The fermentation is carried out in a test-tube shaker (350 s.p.m.) at 30° C. for 72 hrs. to give the following results of quantitative determinations of the sample broths.

| Microorganism strains used | 2-keto-L-gulonic acid (γ/ml) |
|---|---|
| *Arthrobacter simplex* ASM-10 | 107 |
| *Staphylococcus aureus* ASM-30 | 53 |
| *Micrococcus dinitrificans* IFO 12442 | 86 |
| *Micrococcus*[*rubeus*]*rubensIFO 3768* | 43 |
| *Micrococcus roseus* IFO 3764 | 28 |
| *Pseudomonas chloroaphis* IFO 3904 | 49 |

What is claimed is:

1. A process for producing 2-keto-L-gulonic acid or a salt thereof which comprises; contacting a 2-keto-L-gulonic acid producing strain selected from microorganisms which belong to the genera of Brevibacterium, [Arthrobacter,] Bacillus, Staphylococcus, Micrococcus and Pseudomonas, with 2,5-diketo-D-gluconic acid or a salt thereof, under conditions sufficient to produce 2-keto-L-gulonic acid, and recovering the produced 2-keto-L-gulonic acid or any salts thereof from the resultant mixture.

2. A process as claimed in claim 1, wherein the 2-keto-L-gulonic acid producing strain is incubated in a medium containing 2,5-diketo-D-gluconic acid or a salt thereof to effect a fermentative action therein, and recovering 2-keto-L-gulonic acid or any salts thereof accumulated during the incubation from the medium.

3. A process as claimed in claim 2, wherein said 2-keto-L-gulonic acid producing strain belongs to the genus of Brevibacterium.

4. A process as claimed in claim 3, wherein said strain belongs to Brevibacterium ketosoreductum.

[5. A process as claimed in claim 2, wherein said 2-keto-L-gulonic acid producing strain belongs to the genus of Artheofacter.]

6. A process as claimed in claim 2, wherein said 2-keto-L-gulonic acid producing strain belongs to the genus of Bacillus.

7. A process as claimed in claim 2, wherein said 2-keto-L-gulonic acid producing strain belongs to the genus of Staphylococcus.

8. A process as claimed in claim 2, wherein said 2-keto-L-gulonic acid producing strain belongs to the genus of Micrococcus.

9. A process as claimed in claim 2, wherein said 2-keto-L-gulonic acid producing strain belongs to the genus of Pseudomonas.

10. A process as claimed in claim 1, wherein cells of said microorganism strain are contacted with a substance containing 2,5-diketo-D-gluconic acid or a salt thereof under conditions sufficient to produce 2-keto-L-gulonic acid, and the 2-keto-L-gulonic acid or any salts thereof produced and accumulated as a result of the contact are recovered from the resultant mixture.

11. A process as claimed in claim 1, wherein an aqueous medium containing viable cells of said microorganism is contacted with a substance containing 2,5-diketo-D-gluconic acid or a salt thereof.

12. A process for producing 2-keto-L-gulonic acid or a salt thereof which comprises cultivating 2-keto-L-gulonic acid producing microorganisms selected from the group consisting of Brevibacterium ketosoreductum, [Arthrobacter simplex,] Bacillus megaterium, Staphylococcus aureus, Micrococcus dinitrificans, Micrococcus rubens, Micrococcus roseus and Pseudomonas chlororaphis, and mutants thereof, in an aqueous nutrient medium in the presence of 2,5-diketo-D-gluconic acid or a salt thereof, and recovering the produced 2-keto-L-gulonic acid or salts thereof from the resultant mixture.

13. A process as claimed in claim 12, wherein said microorganism is Brevibacterium ketosoreductum ATCC 21914.

[14. A process as claimed in claim 12, wherein said microorganism is Arthrobacter simplex ATCC 21917.]

15. A process as claimed in claim 12, wherein said microorganism is Bacillus megaterium ATCC 21916.

16. A process as claimed in claim 12, wherein said microorganism is Staphylococcus aureus ATCC 21915.

* * * * *